United States Patent [19]
Heimberger et al.

[11] Patent Number: 5,930,424
[45] Date of Patent: Jul. 27, 1999

[54] DEVICE FOR CONNECTING A FIBER OPTIC CABLE TO THE FIBER OPTIC CONNECTION OF AN ENDOSCOPE

[75] Inventors: Rudolf Heimberger, Oberderdingen; Uwe Schaumann, Villingen-Schwenningen; Martin Dolt, Knittlingen, all of Germany

[73] Assignee: Richard Wolf GmbH, Knittlingen, Germany

[21] Appl. No.: 08/771,527

[22] Filed: Dec. 23, 1996

[30] Foreign Application Priority Data

Dec. 22, 1995 [DE] Germany ............... 295 20 445

[51] Int. Cl.$^6$ ............................................. G02B 6/40
[52] U.S. Cl. ..................... 385/53; 385/54; 385/55; 385/70; 385/71; 362/32; 600/132; 600/182
[58] Field of Search ................... 385/53, 54, 55, 385/56, 70, 71, 901, 902; 362/32; 600/132, 182

[56] References Cited

U.S. PATENT DOCUMENTS

| 4,830,458 | 5/1989 | Hiltebrandt | 385/54 |
| 4,880,291 | 11/1989 | Aberson | 385/55 |
| 5,113,462 | 5/1992 | Clancy | 385/53 |
| 5,142,598 | 8/1992 | Tabone | 385/53 |
| 5,265,186 | 11/1993 | Fishkin | 385/53 |
| 5,297,226 | 3/1994 | Fukunishi | 385/54 |
| 5,452,391 | 9/1995 | Chou | 385/53 |
| 5,522,006 | 5/1996 | Takeuchi | 385/53 |
| 5,625,731 | 12/1994 | Turgeon | 385/53 |
| 5,708,745 | 1/1998 | Yamaji | 385/53 |

Primary Examiner—Gene Mancene
Assistant Examiner—Ira Hatton
Attorney, Agent, or Firm—Cohen, Pontani, Lieberman & Pavane

[57] ABSTRACT

The invention relates to a device for connecting a fiber optic cable to the fiber optic connection of an endoscope. An end section of the optical fiber is mounted as a bundle of fibers in a housing part and a coupling part is provided for the fastening with a positive fit of this housing part to the fiber optic connection on the endoscope side. To ensure that the optical fiber ends always come into contact with one another free of play and to improve the cleaning access, the coupling part is arranged on the housing part axially displaceable against a spring force in the direction of the fiber optic connection on the endoscope side.

6 Claims, 1 Drawing Sheet

DEVICE FOR CONNECTING A FIBER OPTIC CABLE TO THE FIBER OPTIC CONNECTION OF AN ENDOSCOPE

BACKGROUND OF THE INVENTION

1. Field of the Invention

The invention relates to a device for connecting a fiber optic cable to the fiber optic connection of an endoscope, in which an end section of the optical fiber is mounted as a bundle of fibers in a housing part and in which a coupling part is provided for the fastening with a positive fit of this housing part to the fiber optic connection on the endoscope side.

2. Description of the Related Art

The German Utility Model DE-U-1893615 describes a device, in which the connection is effected via a plug on the endoscope side and sleeve type receiving socket on the cable side. The receiving socket is provided with a wall slot and an inner circumferential groove in which there is guided a radially displaceable slide which is provided with an opening corresponding to the outer diameter of the plug. This slide engages into a groove provided on the plug and holds the plug and receiving socket together with a positive fit.

With such a fixation it cannot always be ensured that a play-free bearing of the two optical fiber end faces coming into contact with one another is achieved, and because of this a coupling of light from the fiber optic cable into the fiber optical cable connection of the endoscope with minimal losses cannot always be guaranteed. Moreover the cleaning of the fiber optic cable end arranged in the receiving socket is very difficult to carry out due to the sleeve type design.

Also, with such a device, any regrinding of the fiber optic cable end arranged in the receiving socket is almost impossible. Even if such regrinding were possible, this would lead to the distance between both those fiber optic cable ends coming into contact with one another becoming larger which would lead to considerable losses.

Devices of the companies Olympus and Storz are further known, with which screw connections are used for connecting fiber optic cables and endoscopes or endoscope optics. These devices have the disadvantage that a direct bearing of the bundle ends of the optical fibers which come into contact with one another cannot be guaranteed in every case. With these designs too there is the problem of cleaning the light exit surface, arranged within the screw connection, of the fiber optic cable, let alone for example being able to subsequently treat damage by grinding. Apart from this, such screw connections tend to jam when being applied and are thus comparatively difficult to handle. Due to the different individual hand forces, a defined clamping or pressure force cannot be achieved.

SUMMARY OF THE INVENTION

It is an object of the invention to design a device for connecting a fiber optic cable to a fiber optic connection of an endoscope such that on the one hand, simple cleaning and where necessary any subsequent treatment of the distal end surface of the optical fiber is made possible, and on the other hand, a defined play-free bearing of the two optical fiber ends coming into contact with one another is achieved, in order to ensure an almost loss-free coupling of light from the fiber optic cable into the fiber optic cable connection. Furthermore, the device is to be designed such that it may be used to couple the fiber optic cable with endoscopes or endoscope optic having a short as well as a long fiber optic cable connection joint.

According to the invention this object is achieved in that with the previously described device the coupling part is arranged on the housing part axially displaceable against a spring force in the direction of the fiber optic connection on the endoscope side.

By way of this solution according to the invention a play-free bearing of both ends of the optical fibers coming into contact with one another is always achieved. By these means a coupling of light from the fiber optic cable into the optical fiber of the endoscope with little losses is ensured, even when the distal end of the fiber optic cable has been shortened, for example by regrinding.

The axial compensation of length serves for offsetting tolerances caused by manufacture, and thus there is created the possibility of coupling the fiber optic cable designed according to the invention to endoscope optics having a short fiber optical cable connection piece as well as those having a long fiber optic cable connection piece. Due to the accessibility to the end of the fiber bundle, the device according to the invention provides a better opportunity for cleaning.

It is useful to design the device such that the coupling part comprises a bar which is arranged displaceable essentially transverse to the longitudinal axis of the coupling part and which is provided for the positive engagement in a groove of the fiber optic connection on the endoscope side. This permits a simple, and at the same time secure fastening of the coupling part to the fiber optic connection on the endoscope side.

Preferably the bar is formed with an annular shape and is spring loaded in the direction of displacement so that it is automatically pushed into its locking position in the groove of the fiber optic connection on the endoscope side.

In order to limit the travel of the bar and to secure the bar with a positive fit on the coupling part, the coupling part is provided with a pin. This pin can be axially displaceable and spring loaded or rigidly fastened. In the case that the pin is spring loaded, the bar and the pin may be designed such that on connection of the fiber optic cable to the fiber optic connection of the endoscope, the bar is automatically guided into the groove.

It is useful that the connection between the housing part and the coupling part is effected via two sleeves arranges at the distal end and at the proximal end of these parts respectively. A spring arranged between these ensures that the end face of the optical fiber which is connected to the housing lies at the free end of the coupling part. Furthermore, this spring provides for a defined pressure force. The sleeves may be produced from plastic e.g. polyetheretherketone.

BRIEF DESCRIPTION OF THE DRAWINGS

The invention is hereinafter described in more detail by way of preferred embodiments shown in the drawings. These show.

DETAILED DESCRIPTION OF THE PRESENTLY PREFERRED EMBODIMENTS

Figure 1:
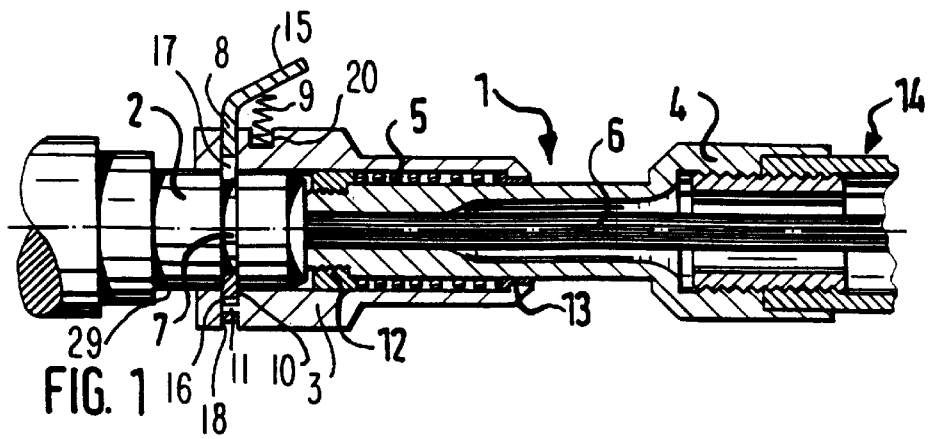
FIG. 1 the connection between the fiber optic cable connection according to the invention, represented in longitudinal section, and the fiber optic cable connection joint of an endoscope of a known design with a rigid pin securing the bar to the coupling.
Figure 2:
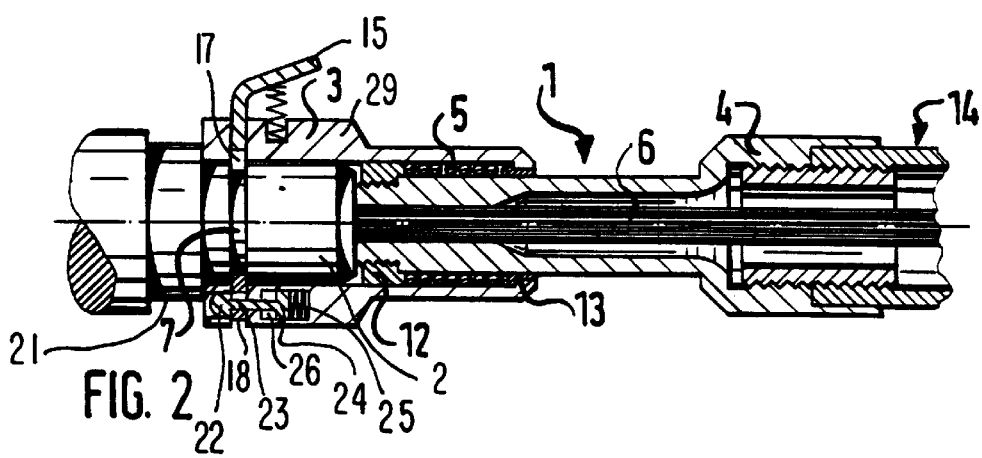
FIG. 2 the connection between the fiber optic cable connection according to the invention, represented in longitudinal section, and the fiber optic cable connection joint of an endoscope of a new design with a spring-loaded pin securing the bar to the coupling.

FIG. 1 shows the device 1 according to the invention, in which a fiber optic cable 14 is connected to the fiber optic connection 2 of an endoscope (not shown). The fiber optic connection 2 (fiber optic cable connection joint) comprises a cylindrical part 29 having an outer circumferential groove 7 disposed in a spaced relation to its proximal end and a circumferential outer lip 21 disposed at its distal end. The device 1 can be connected to a fiber optic connection 2 of an endoscope of the known design (FIG. 1) as well as to that of an endoscope of a new design having an altered groove location (FIG. 2). The end section of the optical fiber 6 of the fiber optic cable 14 is mounted as a bundle of fibers in a cylindrically stepped housing part 4. On the housing part 4, a coupling part 3 is axially displaceably arranged against a spring force acting in the direction of the fiber optic connection 2. For this purpose, between the housing part 4 and the coupling part 3 there are arranged two sleeves 12 and 13 seated at the distal and proximal ends of these parts respectively. The sleeve 12 is screwed onto the distal end section of the housing part 4, this section being provided with an external thread, and the sleeve 13 is inserted with a positive fit into the coupling part 3 between this and the housing part 4. A first helical spring 5 is arranged between the two sleeves 12 and 13 and presses the coupling part 3 into the position shown in FIG. 3 in which the free end of the optical fiber 6 terminates roughly at the end face of the coupling part 3.

The coupling part 3 is provided with an upper slit 17 positioned transversely to the longitudinal axis of the coupling part 3 and substantially near its distal end, a corresponding lower slit 18 also positioned transversely to the longitudinal axis of the coupling part 3 and aligned with slit 17, and a cylindrical recess 20 linearly displaced from slit 17 towards the proximal end of coupling part 3 and arranged perpendicularly to the longitudinal axis of the coupling part 3. The coupling part 3 is also provided with an essentially annular bar 8 having an upper circumferential portion and a lower circumferential portion. The bar 8 is arranged displaceable transverse to the longitudinal axis of the coupling part 3, with the upper circumferential portion of the bar 8 being disposed at least partially within the upper slit 17, and the lower circumferential portion of the bar 8 being disposed at least partially within the lower slit 18. The coupling part 3 is also provided with a pin 11, arranged perpendicularly to lower slit 18 and along the longitudinal axis of the coupling part 3, for limiting the transverse movement of, and retaining the bar 8.

Figure 4A:
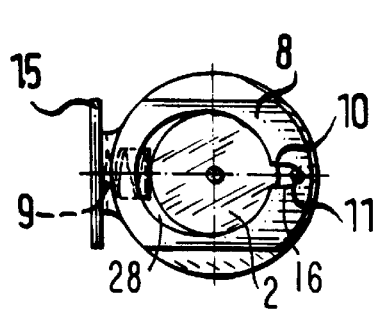
FIG. 4A the bar engaged in the groove of the fiber optic cable connection joint represented in an end view in accordance with FIG. 1.
Figure 4B:
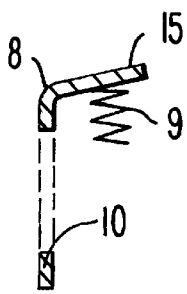
FIG. 4B a side view of the bar in accordance with FIG. 4A.

FIG. 4A shows the annular design of the bar 8, while FIG. 4B shows a side view of the bar 8. For the purpose of guiding, the bar 8 is formed laterally flattened corresponding to the width of the slits 17 and 18 in the coupling part 3. The upper portion of the bar 8 is led to the outer side of the coupling part 3 via the upper slit 17 and is bent about 90°, where it forms a key type finger surface 15 which is positioned above the cylindrical recess 20. A second spring 9 is positioned within the cylindrical recess 20 and in contact with the underside of the finger surface 15 so as to apply spring force to the bar 8 via the finger surface 15 in the direction upwardly transverse to the longitudinal axis of the coupling part 3. The bar 8 further comprises a central cylindrical recess 28, defined by an inner edge 10, which is dimensioned such that the cylindrical part 29 of the fiber optic cable connection 2 can be guided through with some clearance. Centrally disposed at the lower portion of the bar 8, the inner edge 10 comprises a recess 16 which engages the pin 11 to restrict the transverse upward displacement of the bar 8. It should be understood that without the retaining action of the pin 11, the second spring 9 would push the bar 8 out of the coupling part 3.

In a first embodiment of the device 1, shown in FIG. 1, the pin 11 is rigidly attached to the coupling part 3. When the device 1 is used, the coupling part 3 is pushed over the fiber optic connection 2 until the bar 8 enters into the groove 7 with its inner edge 10 on account of the force of the spring 9 pushing the bar 8 upwards against the surface of the cylinder part 29. In this position the coupling part 3 is connected to the fiber optic connection 2 with a positive fit. By way of the force of the spring 5, the housing part 4 with its end face terminating with the planely ground bundle of fibers 6, is pressed against the corresponding end face of the fiber optic connection 2. To facilitate connection the finger surface 15 may be pressed downwardly to align the inner edge 10 with the inner surface of the coupling part 3.

For unlocking, the finger surface 15 is pressed downwardly in the direction of the coupling part 3 against the force of the second spring 9, causing the inner edge 10 of the bar 8 to exit the groove 7 so that the coupling part 3 may be pulled from the fiber optic connection 2.

Figure 3:
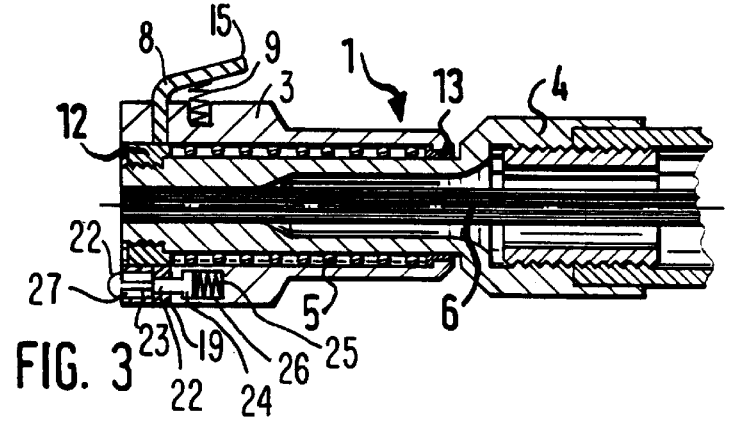
FIG. 3 a longitudinal section of the fiber optic cable connection of FIG. 2 in the decoupled position.

In a second embodiment of the device 1, shown in FIGS. 2 and 3, the pin 11 is preferably spring-actuated. The pin 11 comprises a cylindrical pin portion 22 with a circumferential channel 23 positioned in spaced relation to its distal end, and a cylindrical ridge portion 24 positioned at the proximal end. A cylindrical pin chamber 26, sized to accommodate the ridge portion 24, is centrally positioned in the lower circumferential portion of the coupling part 3, perpendicular to the lower slit 18 and aligned with the longitudinal axis of the coupling part 3. The pin chamber 26 comprises an aperture 19, sized to accommodate the pin portion 22, communicating with the distal end of the coupling part 3. A third spring 25 is disposed within the pin chamber 26. The pin 11 is positioned partially within the pin chamber 26 so that the third spring 25 pushes against the ridge portion 24 and displaces the pin 11 in the direction of the fiber optic connection 2. Because the ridge portion 24 cannot fit through the aperture 19, the pin 11 is at least partially retained within the pin chamber 26.

As shown in FIG. 3, when the coupling part 3 is not connected to the fiber optic connection 2, the distal end of the pin 11 extends above the cross-sectional surface of the device 1. The recess 16 of the bar 8 engages the pin portion 22 of the pin 11 such that the inner edge 10 is aligned with the inner surface of the coupling part 3 for easy insertion of the fiber optic connection 2. Furthermore the pin 11 retains the bar 8 within the coupling part 3.

When the device 1 is used, the coupling part 3 is pushed over the fiber optic connection 2 until the lip 21 presses against the distal end of the pin 11, pushing the pin 11 towards the pin chamber 26, against the force of the third spring 25, until the recess 16 of the bar 8 enters into the channel 23 on the pin 11 allowing the second spring 9 to push the bar 8 upwards against the surface of the cylinder part 29 so that the inner edge 10 can enter the groove 7. In this position the coupling part 3 is connected to the fiber optic connection 2 with a positive fit. By way of the force of the spring 5, the housing part 4 with its end face terminating with the planely ground bundle of fibers 6, is pressed against the corresponding end face of the fiber optic connection 2. This embodiment of the pin 11 is advantageous because it facilitates easy insertion of the optical connection 2 into the coupling part 3 since the pin 11 keeps the bar 8 from pressing against the cylinder part 29 until after it enters the coupling part 3.

For unlocking, the finger surface 15 is pressed downwardly in the direction of the coupling part 3 against the force of the second spring 9, causing the inner edge 10 of the bar 8 to exit the groove 7 so that the coupling part 3 may be pulled from the fiber optic connection 2. The downward motion of the bar 8 also causes the recess 16 to exit the channel 23 causing the pin 11 to be pushed forward by the third spring 25, such that when the finger surface 15 is released the recess 16 engages the pin portion 23 as shown in FIG. 3.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. It is the intention, therefore, to be limited only as indicated by the scope of the claims appended hereto.

What is claimed is:

1. A device (1) for connecting a fiber optic cable (14), having a plurality of optical fibers (6) terminating in a first fiber optic planar end surface, to a fiber optic connection (2) of an endoscope, the fiber optic connection having a first end and a second end, and including an elongated cylindrical part (29) having an outer circumferential groove (7) disposed in spaced relation substantially near the first end, an outer circumferential lip (21), of greater diameter than the cylindrical part (29), positioned at the second end, and a second fiber optic planar end surface disposed within the fiber optic connection (2) and aligned with the first end, the device (1) comprising:
   a hollow cylindrical housing (4) having a longitudinal axis, a first end and a second end, and having a first portion, corresponding to said first end, for receiving the fiber optic cable (14), and a smaller second portion, corresponding to said second end, for internally mounting the plurality of optical fibers (6), said second portion terminating in a cross-sectional end surface, such that said first fiber optic planar surface is aligned with said cross-sectional end surface;
   a first sleeve (12) disposed externally at said second end;
   a hollow cylindrical coupling part (3) sized to slide over said first sleeve (12), having an internal surface, a proximal end and a distal end, an upper section and a lower section, comprising a second sleeve (13), sized to receive said second portion, internally disposed at said proximal end, said coupling part (3) being displaceably mounted external to said second portion;
   a helical first spring (5) disposed external to said second portion and internal to said coupling part (3), said first spring (5) being positioned between and in contact with said first sleeve (12) and said second sleeve (13), such that said coupling part (3) is axially displaceable against the force of said first spring (5) towards said first portion; and
   releasable locking means disposed at said distal end of said coupling part (3) for engaging the groove (7) when the fiber optic connection (2) is inserted into said coupling part (3) causing the cylindrical part (29) to be retained within said coupling part (3), such that the first fiber optic planar end surface is in positive contact with the second fiber optic planar end surface, wherein said positive contact is reinforced by the action of said first spring (5) pushing the first fiber optic planar end surface against the second fiber optic planar end surface of the fiber optic connection (2).

2. The device (1) of claim 1 wherein:
   said coupling part (3) further comprises:
      an upper slit (17) positioned transversely to said longitudinal axis at said upper portion and substantially near said distal end, and a corresponding lower slit (18) positioned transversely to said longitudinal axis at said lower portion opposite from, and aligned with, said upper slit (17),
      a cylindrical recess (20) linearly displaced from said slit (17) towards said proximal end, and positioned on said upper portion perpendicularly to said longitudinal axis;
      a locking pin (11), positioned centrally in said lower section and extending from said distal end for retaining said releasable locking device; and
   wherein said releasable locking means comprises:
      a laterally flattened annular bar (8), having an upper circumferential portion and a lower circumferential portion, said bar (8) being transversely movably mounted within said coupling part (3), wherein said upper portion is at least partially disposed within said upper slit (17) and wherein said lower portion is at least partially disposed within said lower slit (18), said bar (8) comprising:
         a key surface (15) for releasing said locking means, having an upper surface and a lower surface, said key surface (15) being positioned on said upper portion and extending through said upper slit (17), and being bent at about 90 degrees from a circumferential plane of said bar (8), such that said lower surface is positioned above said cylindrical recess (20),
         a second spring (9), positioned within, and extending from said cylindrical recess (20), having an upper part and a lower part, such that said upper part exerts spring force against said lower surface pushing said bar (8) upward,
         a central cylindrical recess (28), defined by an inner edge (10), sized to receive the fiber optic connection (2) therethrough, said inner edge (10) further comprising a recess (16) centrally positioned on said lower portion, for engaging said pin (11) such that said bar (8) is retained within said coupling part (3) against the force of said second spring (9), wherein positive contact between the device (1) and the fiber optic connection (2) is achieved when the fiber optic connection (2) is pushed into said coupling part (3) until said inner edge (10) engages groove (7) by the force of said second spring (9) pressing said inner edge (10) against said cylinder part (29).

3. The device (1) of claim 2, wherein when said key surface (15) is pressed in the direction of said coupling part (3), said inner edge (10) exits the groove (7) such that the fiber optic connection (2) may be decoupled from the device (1).

4. The device (1) of claim 2, wherein:

said pin (11) comprises:

a cylindrical pin portion (22) having a primary end and a secondary end, comprising a circumferential channel (23) positioned in spaced relation to said primary end, and a ridge portion (24) positioned at said secondary end; and said coupling part (3) further comprises:

a cylindrical pin chamber (26), sized to receive said pin (11), positioned centrally in said lower portion extending towards said proximal end, and perpendicular to said lower slit (18), said pin chamber (26) comprising an aperture (19), sized to receive said pin portion (22), for retaining said ridge portion (24) within said pin chamber (26), said aperture (19) communicating with said distal end, a third spring (25), disposed within said pin chamber (26), pressing against said ridge portion (26), for causing said pin portion (22) to extend from said aperture (19), such that when the device (1) is not coupled to the fiber optic connection (2), said third spring pushes said pin (11) so that said primary end of said pin (11) extends from said distal end causing said recess (16) to engage said pin portion (22) and causing said inner edge (10) to align with said internal surface to facilitate insertion of the fiber optic connection (2), wherein positive contact between the device (1) and the fiber optic connection (2) is achieved when the fiber optic connection (2) is pushed into said coupling part (3) until the lip (21) presses said primary end of said pin (11) towards said pin chamber (26) causing said recess (16) to enter said channel (23) thereby causing said inner edge (10) to engage groove (7) by the force of said second spring (9) pressing said inner edge (10) against said cylinder part (29).

5. The device (1) of claim 4, wherein when said key surface (15) is pressed in the direction of said coupling part (3):

said inner edge (10) exits the groove (7) such that the fiber optic connection (2) may be decoupled from the device (1), and said third spring (25) pushes said pin (11) out of said pin chamber (26) causing said recess (16) to engage said pin portion (22).

6. The device (1) of claim (1) wherein said first sleeve (12) and said second sleeve (13) are composed of plastic.

* * * * *